United States Patent
Kumar

(10) Patent No.: US 12,346,715 B2
(45) Date of Patent: Jul. 1, 2025

(54) DATA PROTECTION MANAGEMENT OF APPLICATION INSTANCE EXECUTING IN ACCORDANCE WITH VIRTUAL VOLUME-BASED STORAGE SYSTEM

(71) Applicant: EMC IP Holding Company LLC, Hopkinton, MA (US)

(72) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 769 days.

(21) Appl. No.: 17/103,184

(22) Filed: Nov. 24, 2020

(65) Prior Publication Data

US 2022/0164211 A1  May 26, 2022

(51) Int. Cl.
*G06F 9/455* (2018.01)
*G06F 3/06* (2006.01)

(52) U.S. Cl.
CPC ........ *G06F 9/45558* (2013.01); *G06F 3/0619* (2013.01); *G06F 3/065* (2013.01); *G06F 3/0665* (2013.01); *G06F 3/0673* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 8,140,480 | B1* | 3/2012 | Tsaur | G06F 11/1464 707/648 |
| 10,270,796 | B1* | 4/2019 | Veeraswamy | H04L 63/1433 |
| 10,922,132 | B1* | 2/2021 | Shiramshetti | G06F 21/53 |
| 2015/0378849 | A1* | 12/2015 | Liu | G06F 16/188 711/162 |
| 2019/0163578 | A1* | 5/2019 | Anami | G06F 11/1453 |
| 2019/0228087 | A1* | 7/2019 | Lee | G06F 9/45558 |
| 2020/0034250 | A1* | 1/2020 | Chandrasekaran | G06F 9/45558 |
| 2021/0011627 | A1* | 1/2021 | Sridharan | G06F 3/0619 |

OTHER PUBLICATIONS

NVM Express, "NVM Express, Revision 1.3," NVM Express, May 1, 2017, 282 pages.
VMware, Inc., "VMware vSphere Virtual Volumes," https://www.vmware.com/content/dam/digitalmarketing/vmware/en/pdf/solutionoverview/products/virtualvolumes/vmware_virtual_volumes_solutionsoverview.pdf, Sep. 2015, 2 pages.
VMware, Inc., "VMware vSphere Virtual Volumes (vVols): Getting Started Guide," Hyperconverged Infrastructure Business Unit, Technical Documentation v 1.3, Sep. 2019, 40 pages.

\* cited by examiner

*Primary Examiner* — Wynuel S Aquino
(74) *Attorney, Agent, or Firm* — Ryan, Mason & Lewis, LLP

(57) ABSTRACT

Data protection management techniques in information processing systems are disclosed. For example, a method is provided to manage generation of a copy of data of an application instance executed by a virtual processing device of a host device operatively coupled to a virtual volume-based storage system. Generation of the copy of the data of the application instance is caused to be performed on the virtual volume-based storage system independent of a virtualization layer associated with the host device.

20 Claims, 7 Drawing Sheets

DATA PROTECTION MANAGEMENT OF APPLICATION INSTANCE EXECUTING IN ACCORDANCE WITH VIRTUAL VOLUME-BASED STORAGE SYSTEM

FIELD

The field relates generally to information processing systems, and more particularly to data protection management in information processing systems.

BACKGROUND

Managing copies (e.g., snapshots) of data associated with application programs executing on host devices (e.g., hosts) and stored on a storage system (e.g., storage arrays) operatively coupled to the hosts can be a challenge. This challenge is even more significant for information processing systems with hosts and storage arrays that implement virtualization functionalities.

SUMMARY

Illustrative embodiments provide improved data protection management in information processing systems.

For example, in one illustrative embodiment, a method is provided to manage generation of a copy of data of an application instance executed by a virtual processing device of a host device operatively coupled to a virtual volume-based storage system, wherein generation of the copy of the data of the application instance is caused to be performed on the virtual volume-based storage system independent of a virtualization layer associated with the host device.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide data protection for an application instance running inside a virtual machine associated with a virtual volume storage platform at an application-level granularity rather than a virtual machine-level granularity.

These and other features and advantages of embodiments described herein will become more apparent from the accompanying drawings and the following detailed description.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
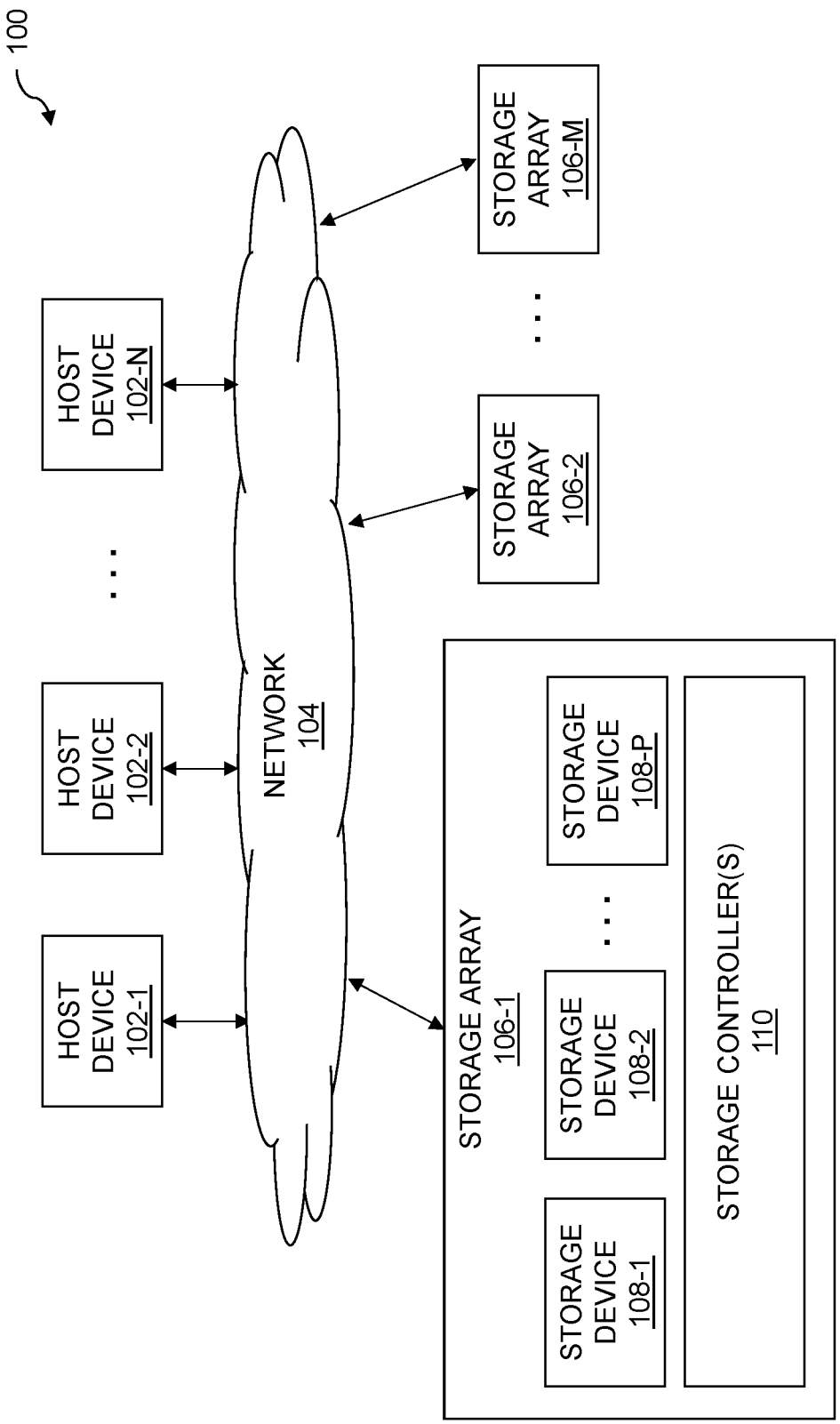
FIG. 1 illustrates an information processing system with which one or more illustrative embodiments can be implemented.

FIG. 1 shows an information processing system 100 configured in accordance with an illustrative embodiment. The information processing system 100 comprises one or more host devices 102-1, 102-2, . . . 102-N (collectively host devices 102, or individually host device 102) that communicate over a network 104 with one or more storage arrays 106-1, 106-2, . . . 106-M (collectively storage arrays 106, or individually storage array 106). By way of example, the network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands, e.g., a read operation comprises one or more read commands and a write operation comprises one or more write commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume (e.g., virtual volumes as will be further explained herein). A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs. VMs and containers are examples of what are more generally refer to as "virtual processing devices."

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, at least a portion of the storage arrays 106 may be used to implement one or more storage nodes in a cluster storage system comprising a plurality of storage nodes interconnected by one or more networks.

In yet another example, at least a portion of the storage arrays 106 may additionally or alternatively be configured to provide network-attached storage (NAS).

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Figure 2:
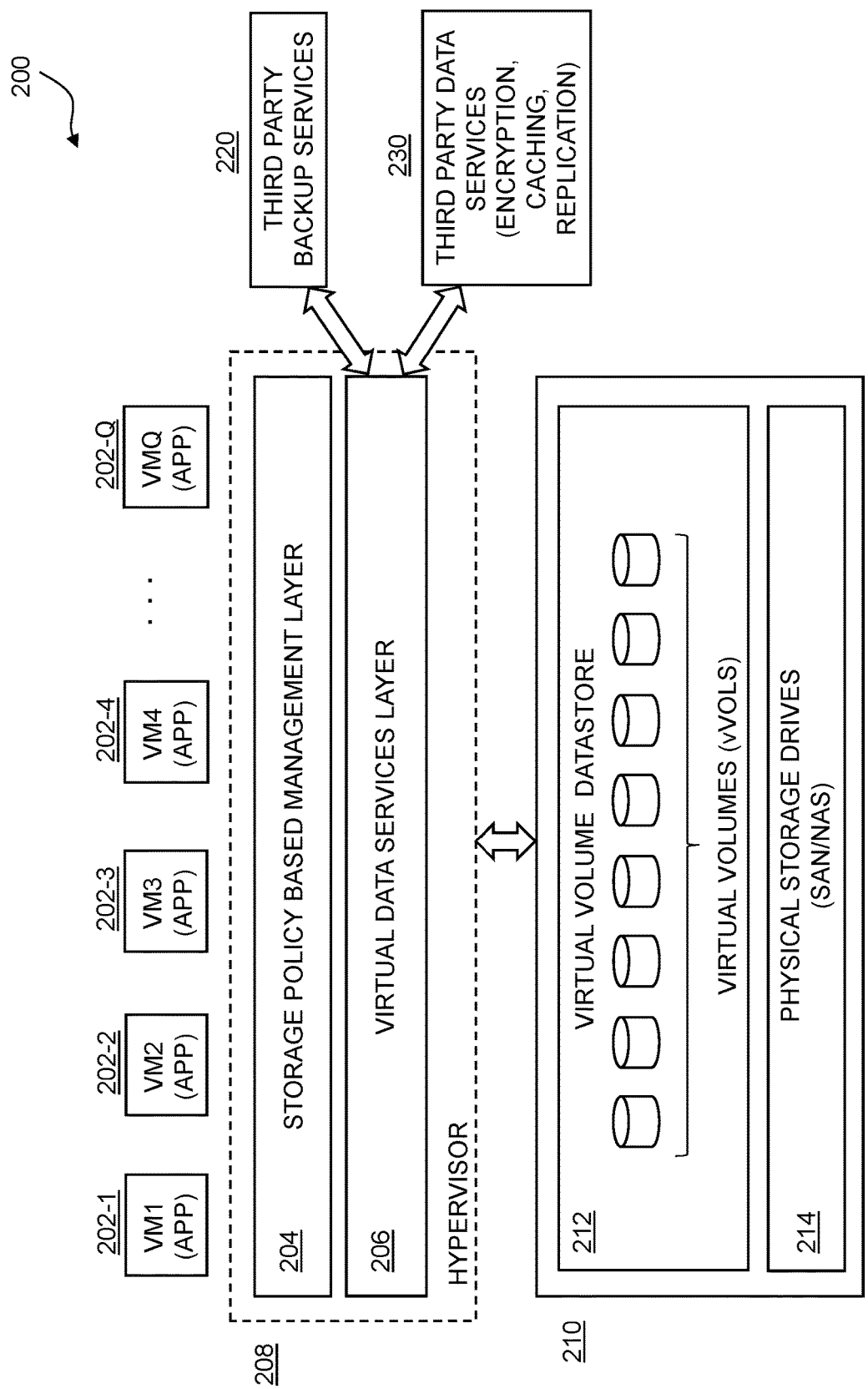
FIG. 2 illustrates an information processing system with a virtual volume-based storage system with which one or more illustrative embodiments can be implemented.

FIG. 2 depicts an information processing system 200 with which one or more embodiments can be implemented. It is to be appreciated that information storage system 200 can implemented as part of information processing system 100. More particularly, information processing system 200 implements the concept of virtual volumes or vVols. The virtual volume framework is an integration and management framework for external storage (storage area network (SAN) and network attached storage (NAS)). One commercial implementation of virtual volumes is available in the hypervisor platform vSphere® available from VMware® (Palo Alto, CA).

As shown in system 200, a set of virtual machines (VMs) 202-1, 202-2, 202-3, 202-4, . . . 202-Q (collectively VMs 202, or individually VM 202) each execute an application instance (APP). An application instance can be an instantiation of an application program or part of an instantiation of part of an application program. An instance or instantiation is an executable or executing piece of software code. Each of the set of VMs 202 may execute instances of the same application or a subset of one or more VMs 202 may implement instances of applications different from instances of applications implemented on other subsets of one or more VMs 202. This framework allows customers (e.g., administrators, tenants, owners of the applications) to assign and manage storage capabilities on a per-application (per-VM) basis at the hypervisor level using a storage policy-based management (SPBM) layer 204. Virtual volumes allow customers to leverage the unique capabilities of their current storage investments and transition without disruption to a simpler and more efficient operational model optimized for virtual environments that works across all storage types. SPBM layer 204 interacts with virtual data services layer 206. Parts or all of the SPBM layer 204 and virtual data services 206 may be implemented as part of a hypervisor layer 208. Virtual data services layer 206 is operatively coupled to third party backup services 220 and third party data services (e.g., encryption, caching, replication, etc.) 230. By way of example, third party services (220 and 230) can be implemented via one or more cloud-based platforms (i.e., public, private, and/or hybrid).

It is to be appreciated that the set of VMs 202, SPBM layer 204, virtual data services layer 206 and hypervisor 208 can be implemented as part of one or more of the host devices 102 (also referred to as hosts, host servers, or application servers) in FIG. 1. That is, a given host device 102 may host more than one application instance (APP) executing in more than one VM 202, while in other embodiments, each application instance and VM is hosted by a different host device 102.

Further, information storage system 200 comprises a storage system 210. The vVols framework virtualizes SAN and NAS devices by abstracting the physical hardware resources (physical storage drives 214) into logical pools of capacity called a virtual volume datastore 212. Virtual volume datastore 212 comprises a set of virtual volumes devices (vVols) as shown in FIG. 2. The vVols can be flexibly consumed and configured to span a portion, one or several storage arrays (e.g., storage arrays 106 in FIG. 1). The virtual volume datastore 212 defines capacity boundaries, access logic, and exposes a set of data services accessible to the VMs 202 provisioned in the pool. vVols of virtual volume datastore 212 are logical constructs that can be configured on the fly (in real-time), when needed, without disruption and without being formatted with a new file system. Native VM representation vVols define a new virtual disk container (virtual volume) that is specific to a VM and independent of the underlying physical storage representations (e.g., logical unit (LUN), file system, object, etc.). The virtual disk becomes the primary unit of data management at the array level. This turns the virtual volume datastore 212 into a VM-centric pool of capacity, enabling execution of storage operations with VM granularity and provisioning of native array-based data services to individual VMs 202. Administrators can ensure the appropriate storage service levels are provided to each individual VM 202.

Still further, the SPBM layer 204 of the vVol framework depicted in FIG. 2 enables hypervisor 208 to no longer need to implement any storage abstraction such as a virtual machine file system (VMFS) and takes on the burden of managing virtual machine storage, e.g., vmdk (a file format that describes containers for virtual hard disk drives to be used in virtual machines), snapshots, etc. and offloads all storage management tasks to the underlying storage system 210. For example, when a vVol from virtual volume datastore 212 is provisioned to a VM 202 via SPBM layer 204, hypervisor 208 makes requests to storage system 210 to provision the virtual volume (vVol) and assigns it to the VM 202.

Whereas the benefit of the vVol framework is clear, this also makes generating a backup of the application somewhat difficult. The hypervisor 208 provides snapshot capability (which is offloaded to storage system snapshot) but the granularity of this snapshot is at the VM level. This means that when a goal is to just protect the application instance inside the virtual machine, this goal is unachievable since, with the existing vVol framework in FIG. 2, the entire virtual machine still needs to be protected. This results in a waste of snapshot capacity. Also, the number of backup copies created via the vSphere® hypervisor is limited to only 32 copies.

Illustrative embodiments provide an improved method to protect an application instance executing inside a virtual machine on a virtual volume type storage system at the granularity of application-level with a non-limited number of snapshots. In illustrative embodiments, this is accomplished by adapting the vVol framework of FIG. 2. One illustrative benefit of this improved method is reduction in snapshot capacity usage as the protection volume is limited to just the volumes on which application data is stored. As such, a greater number of protection copies are available resulting in better protection service level agreements (SLAs) and better recovery point objectives (RPOs).

Figure 3:
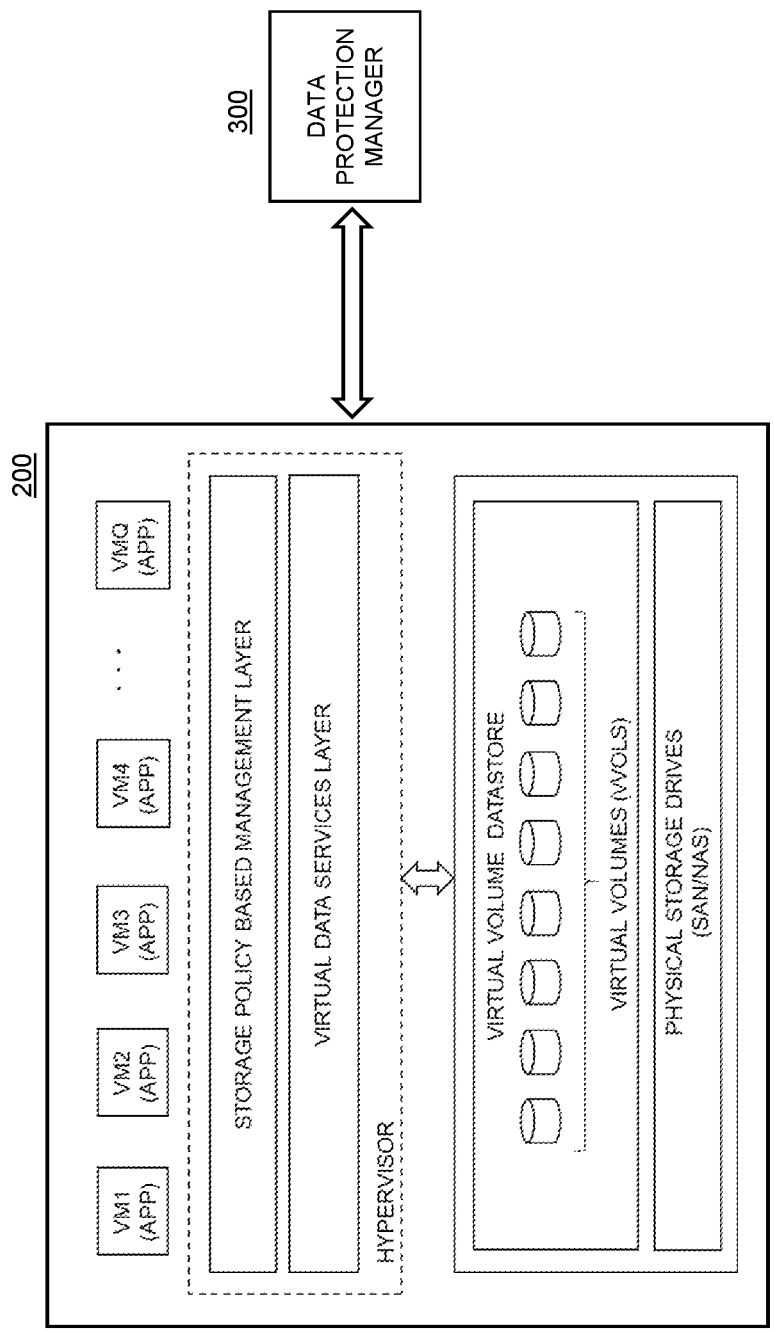
FIG. 3 illustrates an information processing system with a virtual volume-based storage system and data protection management functionalities according to an illustrative embodiment.

Illustrative embodiments provide the above and other functionality in accordance with a data protection manager operatively coupled to the host devices and the underlying storage system of an information processing system with which it is implemented. For example, FIG. 3 depicts a data protection manager (DPM) 300 operatively coupled to information processing system 200. It is to be appreciated that while DPM 300 is shown in FIG. 3 as functionally separate from information processing system 200, in some embodiments DPM 300 is implemented on one or more processing devices remote from processing devices of information processing system 200, while in other embodiments DPM 300 is implemented on one or more processing devices that are part of (local to) information processing system 200.

DPM 300, which will be explained further below, automatically pushes an application-aware agent module (agent) to the host device that employs the vVol framework. An unmanaged vVol snapshot application programming interface (API) is exposed by the storage array controller to create off-the-hypervisor snapshots of vVols. Details of the data protection management functionalities according to illustrative embodiments will be further described in the context of FIGS. 4 and 5.

Figure 4:
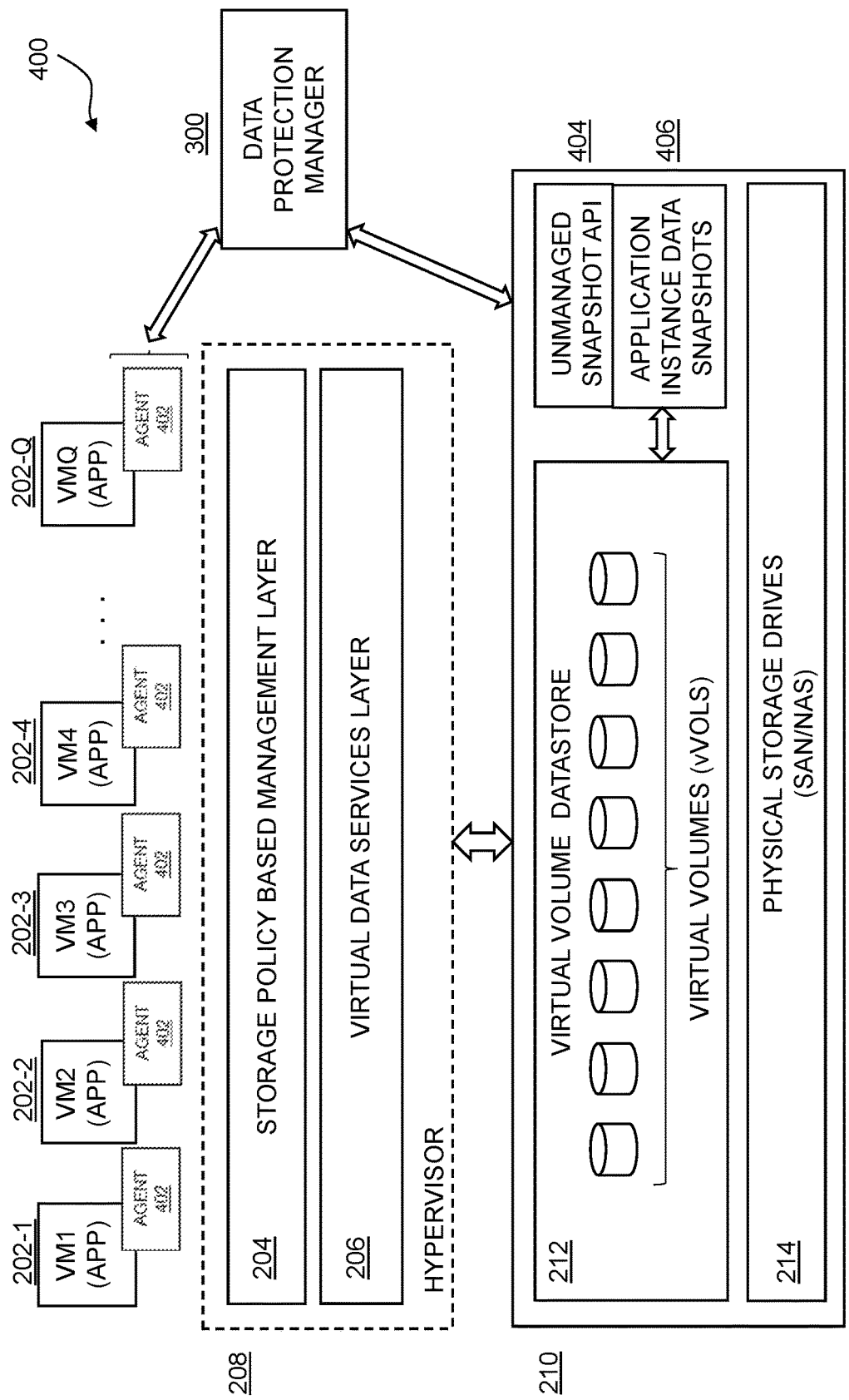
FIG. 4 illustrates an information processing system with a virtual volume-based storage system and data protection management functionalities according to an illustrative embodiment.

FIG. 4 illustrates an information processing system 400 with data protection management functionalities according to an illustrative embodiment. More particularly, FIG. 4 depicts details of an adaptation of the vVol framework of information processing system 200 in FIG. 2 with respect to data protection manager 300. As shown, each VM 202 has an agent 402 running therein that is operatively coupled with DPM 300. Also, an unmanaged snapshot application programming interface (API) 404 is used to generate application instance data snapshots 406 in accordance with storage system 210 as will be further explained. It is to be appreciated that each snapshot is a copy of data of the application instance which is stored as part of a vVol in virtual volume datastore 212 during execution of the application instance on a given VM 202. A methodology for providing data protection management functionalities in accordance with information processing system 400 will now be described in the context of FIG. 5. It is to be understood that DPM 300 causes steps 502 through 518 of methodology 500 to be performed as will be further explained below.

Figure 5:
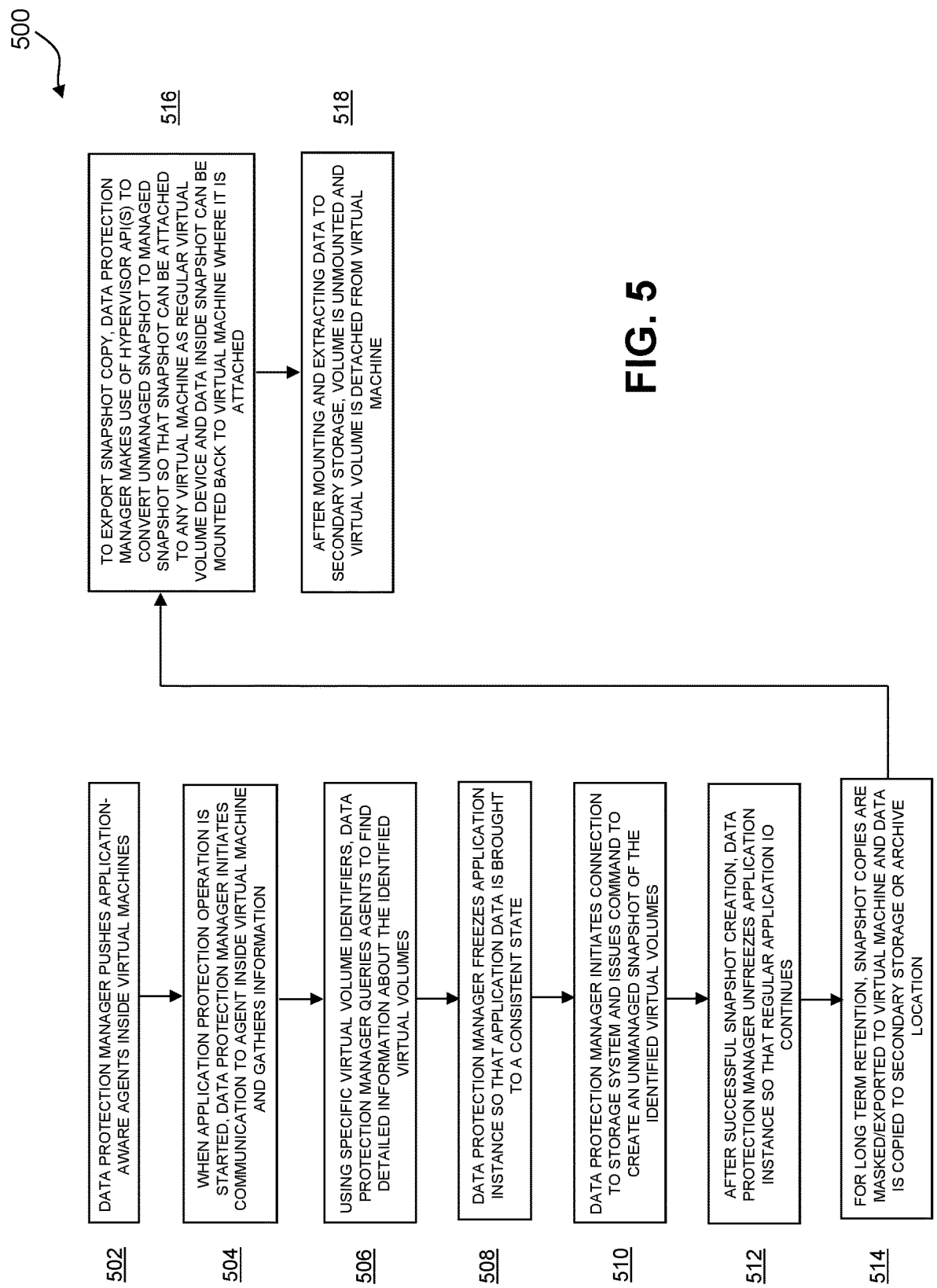
FIG. 5 illustrates a methodology for data protection management in an information processing system with a virtual volume-based storage system according to an illustrative embodiment.

As shown in methodology 500 in FIG. 5, in step 502, DPM 300 first pushes application-aware agents 402 inside VMs 202. More particularly, in illustrative embodiments, an API associated with the hypervisor 208 which is typically used for providing files to the VMs 202 can be used here to receive and insert the agent 402 into each VM 202. Further, in the case of the above-mentioned vSphere® hypervisor platform, insertion can be facilitated using one or more tools installed inside the VMs 202 when the VMs are provisioned. To render the agent module "application aware," software embedded into the agent code is configured to discover the application and communicate with the application via an application-specific API to perform tasks such as quiescing and un-quiescing the application (i.e., quiescing is halting, pausing or altering a device or application to achieve a consistent state, usually in preparation for a backup or other maintenance, while un-quiescing is the reverse of quiescing), recovering the application, etc.

In step 504, when an application protection operation is started, DPM 300 initiates communication with each agent 402 inside each VM 202. Once a communication link is established between DPM 300 and a given agent 402, DPM 300 gathers information from the given agent 402. Such information includes, but is not limited to:

(i) Detailed application instance and application layout information, e.g., application file system volumes, volume groups and physical disks layout information. In some illustrative embodiments, only physical disks information on which application data (e.g., database files, logs etc.) resides is collected.

(ii) For each of the physical disks involved in the application protection operation, the application-aware agent 402 performs a Small Computer System Interface (SCSI) inquiry operation which returns the underlying virtual volumes (vVols) unique identifiers (IDs). More particularly, a SCSI inquiry operation is performed by the agent 402 to find out details of the SCSI disks, e.g., vendor information, disk unique identifier, storage system identifier, etc. vVol IDs are created and managed by the hypervisor 208 (e.g., the vSphere® hypervisor platform) for each of the vVol disks and, when a SCSI inquiry call is performed on a vVol disk which is created and managed by the hypervisor 208, it returns the details of the vVol disk which includes its vVol ID. Typically, the vVol ID is unique in the hypervisor environment and is used to uniquely identify any vVol disk.

In step 506, using the specific vVol identifiers obtained in step 504, DPM 300 queries agents 402 to find further detailed information about the identified vVols. Thus, for example, step 504 may perform a high-level application discovery, e.g., application instance information and high level layout (e.g., file and filesystem information). Step 506 can then take information obtained in step 504 and perform a deeper discovery of information to gather detailed mapping information about the application layout, e.g., files->filesystem->volume groups->physical disks->SCSI disk information. It is to be appreciated that, in alternative embodiments, steps 504 and 506 can be combined depending on the information being obtained.

In step 508, DPM 300 freezes (quiesces or halts) the IO operations of the application instance (APP) executing in each VM 202 so that application data is brought to a consistent state. DPM 300 freezes IO operations via the agent 402, i.e., agent 402 is instructed by DPM 300 to cause the VM 202 to halt the application instance.

In step 510, after a successful freeze operation (e.g., halt regular IO operations), DPM 300 initiates a connection link to storage system 210 (e.g., this could be to a storage controller in the storage system, e.g., 110 in FIG. 1), and once established, DPM 300 issues a command to unmanaged snapshot API 404 to create an unmanaged snapshot of all the vVols identified as part of step 506. The difference between unmanaged and managed snapshot is that managed snapshots are created by the hypervisor 208 (e.g., the above-mentioned vSphere® hypervisor platform) whereas unmanaged snapshots are created without involvement of the hypervisor. In this case, DPM 300 communicates directly with the storage system 210 and creates the unmanaged snapshots. In managed snapshots, DPM 300 calls the hypervisor 208 and the hypervisor 208 communicates with the storage system 210 and creates snapshots.

Unmanaged snapshots are depicted in FIG. 4 in block 406. Note that, as explained above, for the communication between DPM 300 and storage system 210 to create unmanaged snapshots, hypervisor 208 is completely unaware of this snapshot operation, i.e., generation of the snapshots is independent of (e.g., transparent to) the hypervisor (virtualization layer) of the host device. Due to the fact that the hypervisor-enforced limitation of snapshots (e.g., 32 as mentioned above for the existing vVol framework) does not apply, a backup administrator/application owner can request creation of essentially an un-limited number of copies of this type.

In step 512, after successful snapshot creation, DPM 300 unfreezes (un-quiesces) the application instance so that regular application IO continues. Similar to step 508, this step is performed by DPM 300 sending an instruction to agent 402 to cause VM 202 to restart (un-halt) the application instance.

In step 514, for long term retention, the snapshot copies are masked/exported to VMs and data is copied to secondary storage or an archive location, e.g., cloud storage, such as depicted in third party data services 230 in FIG. 2. More particularly, for masking, unmanaged snapshots are first imported to the hypervisor 208 using a hypervisor-provided API. Once the snapshots are successfully imported, they are hot added to the VM 202.

In step 516, to export a snapshot copy from storage system 210, DPM 300 makes use of hypervisor APIs to convert the unmanaged snapshot to a managed snapshot. For any unmanaged vVol copies to be added to a VM 202, the hypervisor 208 needs to be made aware of those snapshot copies. When a snapshot is unmanaged, as explained above, the hypervisor 208 knows nothing about it. In accordance with illustrative embodiments, "conversion(import)" of an unmanaged snapshot to a managed snapshot is the process of making the hypervisor 208 aware of those snapshots. In an illustrative embodiment with the hypervisor 208 comprising the above-mentioned vSphere® hypervisor platform, the conversion process comprises: (i) storing and importing the unmanaged vVol information into the vStorage APIs for Storage Awareness (VASA) repository of the vSphere® hypervisor platform; (ii) binding the imported vVols snapshot to the appropriate protocol endpoint; and (iii) creating a new vmdk path file which references that vVol in the virtual volume datastore 212. After the snapshot is converted to managed, the snapshot can be attached to any VM as a regular vVol (e.g., part of virtual volume datastore 212) and data inside the snapshot can be mounted back to (made accessible to) the VM where it is attached.

In step 518, after mounting and extracting the data to a secondary storage, the volume is unmounted and vVol is detached from the VM.

It is to be understood that, unless stated otherwise, steps performed above that are described as being caused by DPM 300 are initiated by DPM 300 by DPM 300 sending an instruction or command to one or more components in the host device and/or storage system that causes or triggers an operation to be performed therein in a manner that the host device and/or storage system is configured to perform.

It is to be appreciated that while the above examples describe improved data protection management from the perspective of the vVol platform, alternative embodiments may be implemented with other virtual volume platforms.

It is to be appreciated that the FIG. 5 methodology and other features and functionality described above can be adapted for use with other types of information systems configured to execute application instance snapshot services on a data protection management platform or other type of processing platform.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 400 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components described herein can be implemented for use by tenants of such a multi-tenant environment.

As mentioned previously, cloud infrastructure as disclosed herein can include cloud-based systems. Virtual machines provided in such systems can be used to implement illustrative embodiments. These and other cloud-based systems in illustrative embodiments can include object stores.

Illustrative embodiments of processing platforms will now be described in greater detail with reference to FIGS. 6 and 7. Although described in the context of system 400, these platforms may also be used to implement at least portions of other information processing systems in other embodiments.

Figure 6:
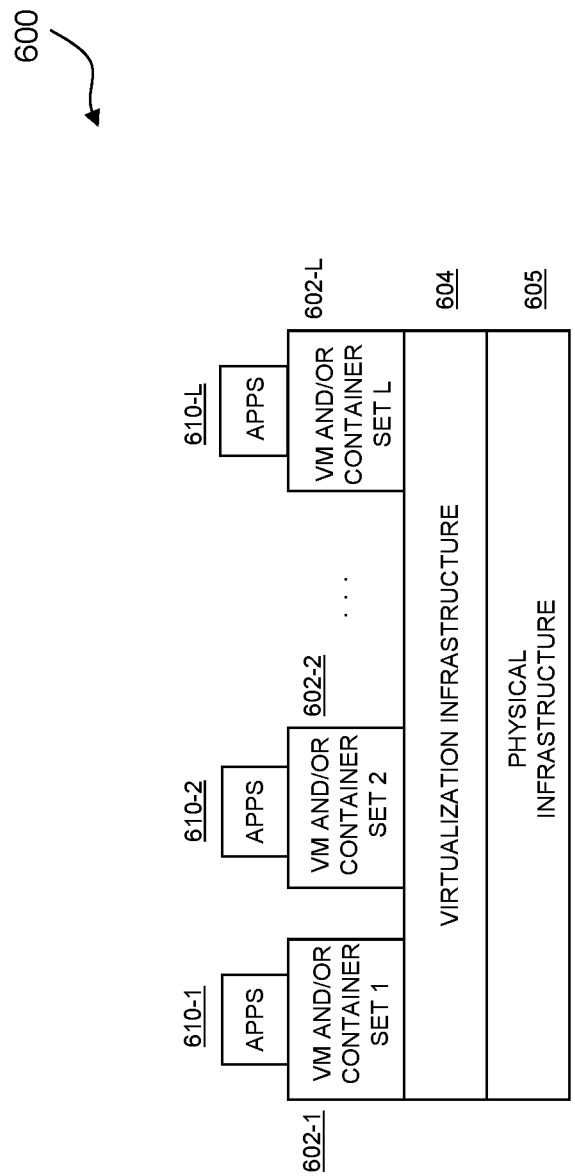
FIGS. 6 and 7 show examples of processing platforms that may be utilized to implement at least a portion of an information processing system according to illustrative embodiments.
Figure 7:
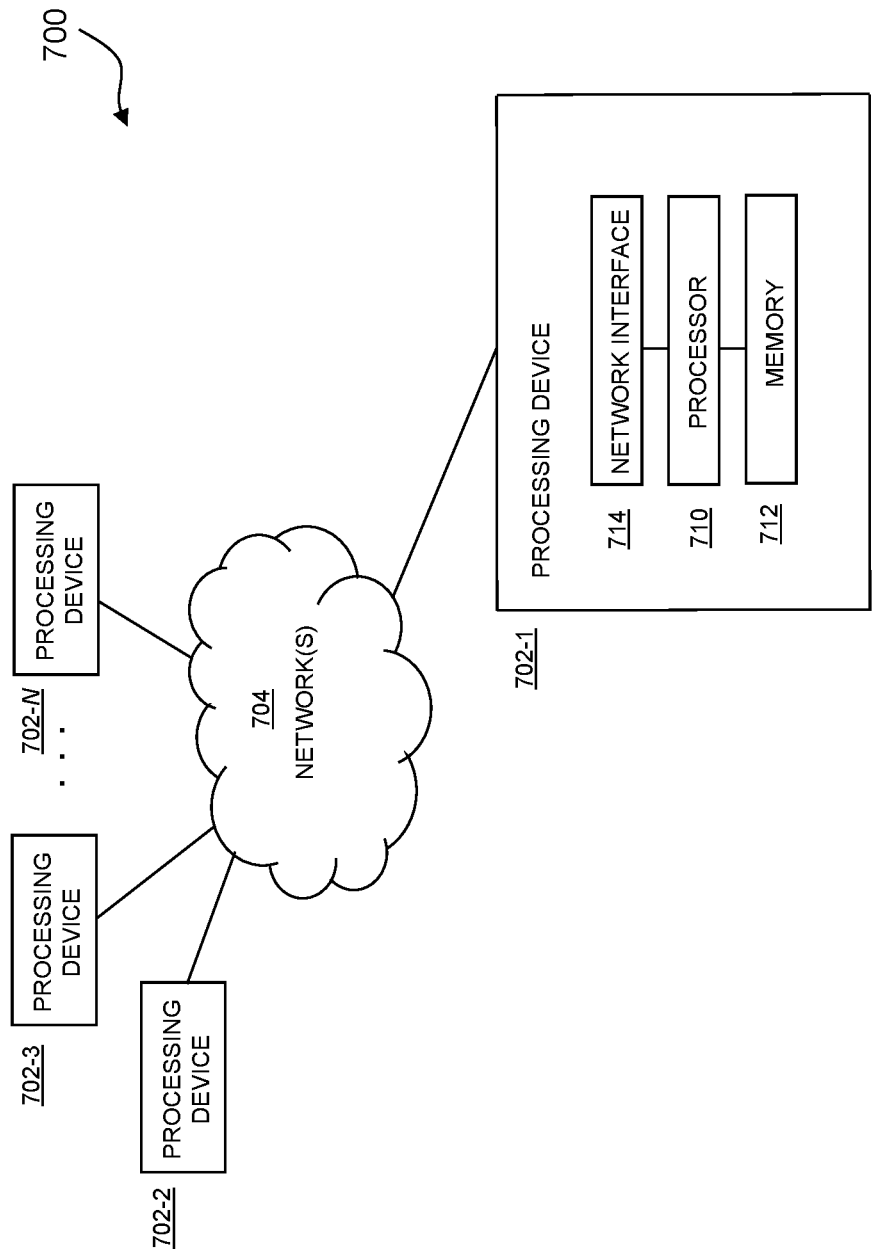

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 400 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 400 and includes a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 400 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the FIG. 4 system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory, the at least one processing device being operatively coupled to an information processing system comprising at least a host device comprising one or more application instances and one or more virtual processing devices, a virtualization layer, and a virtual volume-based storage system, wherein the at least one processing device communicates with the a virtualization layer via a first communication channel, wherein the at least one processing device communicates with the virtual volume-based storage system via a separate second communication channel, and wherein the at least one processing device, when executing program code, is configured to:

cause the virtual volume-based storage system to generate a copy of data of an application instance of the one or more application instances executed by a virtual processing device of the one or more virtual processing devices in the form of an unmanaged snapshot by sending a command to the virtual volume-based storage system in order to provide granularity at an application-level;
cause the virtual volume-based storage system to import the unmanaged snapshot to the virtualization layer using a virtualization layer-provided application programming interface; and
cause conversion of the copy of data of the application instance from an unmanaged snapshot to a managed snapshot to enable access of the managed snapshot by the virtual processing device and attach the managed snapshot in the virtual volume-based storage system;
wherein the virtualization layer associated with the host device has a permitted number of managed snapshots.

2. The apparatus of claim 1, wherein the at least one processing device is further configured to manage generation of the copy of data of the application instance by pushing an agent module to the virtual processing device to cause the agent module to be inserted on the virtual processing device.

3. The apparatus of claim 2, wherein, upon commencement of an application protection operation, the at least one processing device is further configured to manage generation of the copy of data of the application instance by initiating establishment of a communication link with the agent module on the virtual processing device.

4. The apparatus of claim 3, wherein, upon establishment of the communication link, the at least one processing device is further configured to manage generation of the copy of data of the application instance by querying the agent module for information relating to one or more virtual volumes associated with the application instance and stored on the virtual volume-based storage system.

5. The apparatus of claim 4, wherein the at least one processing device is further configured to manage generation of the copy of data of the application instance by causing the application instance to halt input/output operations.

6. The apparatus of claim 5, wherein the at least one processing device is further configured to manage generation of the copy of data of the application instance by causing the application instance to restart input/output operations.

7. The apparatus of claim 1, wherein the virtual processing device comprises a virtual machine.

8. A method performed by at least one processing device comprising a processor coupled to a memory executing program code, the at least one processing device operatively coupled to an information processing system comprising at least a host device comprising one or more application instances and one or more virtual processing devices, a virtualization layer, and a virtual volume-based storage system, wherein the at least one processing device communicates with the a virtualization layer via a first communication channel, and wherein the at least one processing device communicates with the virtual volume-based storage system via a separate second communication channel, the method comprising:
causing the virtual volume-based storage system to generate a copy of data of an application instance of the one or more application instances executed by a virtual processing device of the one or more virtual processing devices in the form of an unmanaged snapshot by sending a command from the at least one processing device to the virtual volume-based storage system via the first communication channel in order to provide granularity at an application-level;

causing the virtual volume-based storage system to import the unmanaged snapshot to the virtualization layer using a virtualization layer-provided application programming interface; and causing conversion of the copy of data of the application instance from an unmanaged snapshot to a managed snapshot to enable access of the managed snapshot by the virtual processing device and attach the managed snapshot in the virtual volume-based storage system;

wherein the virtualization layer associated with the host device has a permitted number of managed snapshots.

9. The method of claim 8, wherein managing generation of the copy of data of the application instance further comprises pushing an agent module to the virtual processing device to cause the agent module to be inserted on the virtual processing device.

10. The method of claim 9, wherein managing generation of the copy of data of the application instance further comprises, upon commencement of an application protection operation, initiating establishment of a communication link with the agent module on the virtual processing device.

11. The method of claim 10, wherein managing generation of the copy of data of the application instance further comprises, upon establishment of the communication link, querying the agent module for information relating to one or more virtual volumes associated with the application instance and stored on the virtual volume-based storage system.

12. The method of claim 11, wherein managing generation of the copy of data of the application instance further comprises causing the application instance to halt input/output operations.

13. The method of claim 12, wherein managing generation of the copy of data of the application instance further comprises causing the application instance to restart input/output operations.

14. The method of claim 8, wherein the virtual processing device comprises a virtual machine.

15. A computer program product comprising a non-transitory processor-readable storage medium having stored therein program code of one or more software programs, the program code being executed by at least one processing device, comprising a processor coupled to a memory, operatively coupled to an information processing system comprising at least a host device comprising one or more application instances and one or more virtual processing devices, a virtualization layer, and a virtual volume-based storage system, wherein the at least one processing device communicates with the a virtualization layer via a first communication channel, wherein the at least one processing device communicates with the virtual volume-based storage system via a separate second communication channel, and wherein, wherein the program code when executed by the at least one processing device causes the at least one processing device to:

cause the virtual volume-based storage system to generate a copy of data of an application instance of the one or more application instances executed by a virtual processing device of the one or more virtual processing devices in the form of an unmanaged snapshot by sending a command to the virtual volume-based storage system in order to provide granularity at an application-level;

cause the virtual volume-based storage system to import the unmanaged snapshot to the virtualization layer using a virtualization layer-provided application programming interface; and cause conversion of the copy of data of the application instance from an unmanaged snapshot to a managed snapshot to enable access of the managed snapshot by the virtual processing device and attach the managed snapshot in the virtual volume-based storage system;

wherein the virtualization layer associated with the host device has a permitted number of managed snapshots.

16. The computer program product of claim 15, wherein the virtual processing device comprises a virtual machine.

17. The computer program product of claim 15, wherein the program code when executed by the at least one processing device further causes the at least one processing device to manage generation of the copy of data of the application instance by pushing an agent module to the virtual processing device to cause the agent module to be inserted on the virtual processing device.

18. The computer program product of claim 17, wherein the program code when executed by the at least one processing device further causes the at least one processing device to manage generation of the copy of data of the application instance by initiating establishment of a communication link with the agent module on the virtual processing device.

19. The computer program product of claim 18, wherein, upon establishment of the communication link, the program code when executed by the at least one processing device further causes the at least one processing device to manage generation of the copy of data of the application instance by querying the agent module for information relating to one or more virtual volumes associated with the application instance and stored on the virtual volume-based storage system.

20. The computer program product of claim 19, wherein the program code when executed by the at least one processing device further causes the at least one processing device to manage generation of the copy of data of the application instance by causing the application instance to halt input/output operations.

* * * * *